United States Patent
Wobig et al.

(10) Patent No.: US 7,408,773 B2
(45) Date of Patent: Aug. 5, 2008

(54) REINFORCED AIR SHROUD

(75) Inventors: Eric C. Wobig, Austin, TX (US); David S. Thornton, Austin, TX (US); Tyler B. Duncan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 72 days.

(21) Appl. No.: 11/563,468

(22) Filed: Nov. 27, 2006

(65) Prior Publication Data

US 2008/0123292 A1 May 29, 2008

(51) Int. Cl.
*H05K 7/20* (2006.01)
*H01L 23/36* (2006.01)

(52) U.S. Cl. .................. 361/695; 361/690; 361/694; 165/80.3; 165/104.33; 165/185; 454/184

(58) Field of Classification Search .................. 361/687, 361/690–697, 714–717, 719–727; 165/80.2, 165/80.3, 80.4, 104.33, 104.34, 121–126, 165/185; 174/16.3, 252, 254; 312/223.2, 312/223.3, 334.4, 138.1, 236, 311, 329; 454/184
See application file for complete search history.

(56) References Cited

U.S. PATENT DOCUMENTS

| | | | |
|---|---|---|---|
| 5,077,601 A * | 12/1991 | Hatada et al. ............... | 257/722 |
| 5,852,547 A | 12/1998 | Kitlas et al. | |
| 5,936,836 A | 8/1999 | Scholder | |
| 6,400,568 B1 * | 6/2002 | Kim et al. ............... | 361/697 |
| 6,504,718 B2 * | 1/2003 | Wu ............................ | 361/695 |
| 6,661,656 B2 * | 12/2003 | Kim et al. ................. | 361/687 |
| 7,061,761 B2 * | 6/2006 | Tucker et al. ............. | 361/695 |
| 7,123,478 B2 * | 10/2006 | Chen ........................ | 361/695 |
| 7,289,323 B2 * | 10/2007 | Chang et al. .............. | 361/695 |
| 7,310,228 B2 * | 12/2007 | Chen ........................ | 361/695 |
| 7,342,786 B2 * | 3/2008 | Malone et al. ............ | 361/695 |

* cited by examiner

*Primary Examiner*—Michael V Datskovskiy
(74) *Attorney, Agent, or Firm*—Haynes and Boone, LLP

(57) ABSTRACT

An air shroud apparatus includes a base wall. A plurality of support walls extend from the base wall in a spaced apart orientation from each other. A component housing is defined between the support walls and the base wall. A reinforced section is located on the base wall and includes a reinforcing beam extending between the plurality of support walls and a plurality of reinforcing members extending between the base wall and the reinforcing beam and located in a spaced apart orientation between the plurality of support walls such that a plurality of air passageways are defined between the reinforcing beam and the reinforcing members. The air shroud may be coupled to an information handling system chassis in order to direct airflow from a fan in the chassis to components in the chassis.

20 Claims, 10 Drawing Sheets

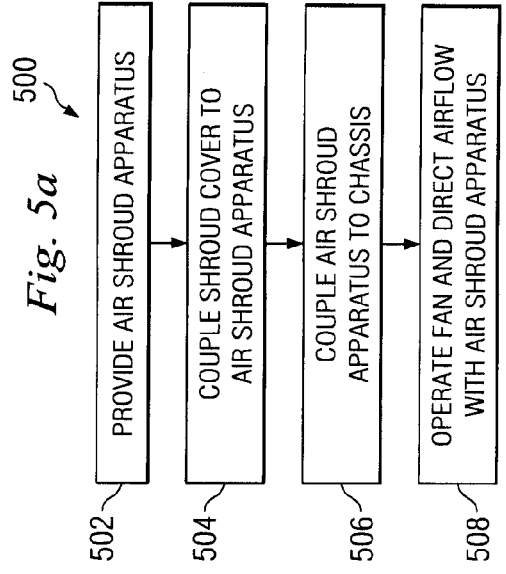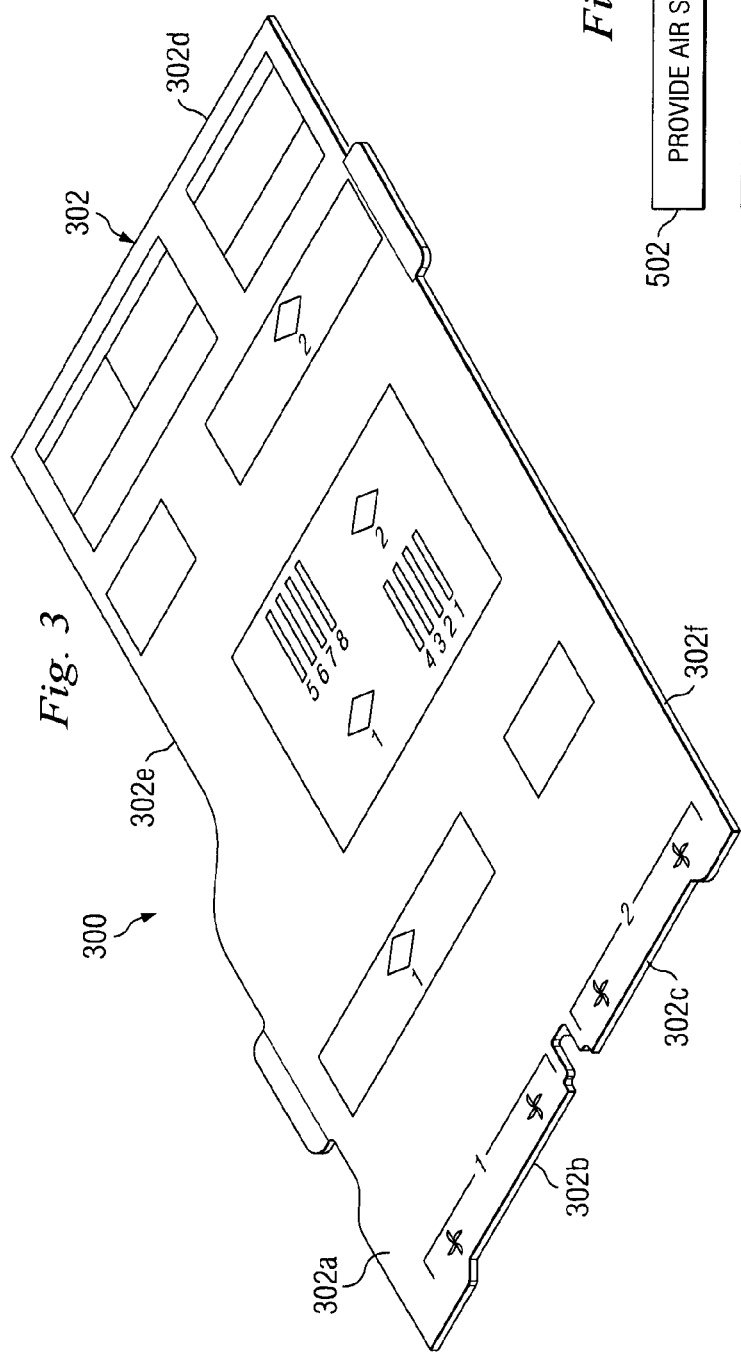

REINFORCED AIR SHROUD

BACKGROUND

The present disclosure relates generally to information handling systems, and more particularly to a reinforced air shroud in an information handling system chassis.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Typically IHSs include an IHS chassis that houses some or all of the components of the IHS. As the performance of the IHS components increases the heat produced by those components increases, and as the component density in the IHS chassis increases, the cooling of the components in the IHS becomes an issue.

Conventional IHS solve this by using air shrouds in the IHS chassis to direct air from fans in the IHS chassis towards the IHS components that need cooling. However, in highly dense IHSs such as, for example, 1 U servers and blades, there is very little volume in the IHS chassis in which to place an air shroud. Furthermore, the air shrouds used tend to include relatively large holes in them in order to allow access to the IHS components without having to remove the air shroud from the IHS chassis. As a result, the air shrouds used in such highly dense IHSs tend to be very flimsy, as conventional structure that could be added to the air shroud to make it stronger is not used, as it would take up space and restrict airflow.

Accordingly, it would be desirable to provide an air shroud absent the disadvantages found in the prior methods discussed above.

SUMMARY

According to one embodiment, an air shroud apparatus includes a base wall, a plurality of support walls extending from the base wall in a spaced apart orientation from each other and defining a component housing between the support walls and the base wall. A reinforced section located on the base wall, the reinforced section including a reinforcing beam extending between the plurality of support walls, and a plurality of reinforcing members extending between the base wall and the reinforcing beam and located in a spaced apart orientation between the plurality of support walls such that a plurality of air passageways are defined between the reinforcing beam and the reinforcing members.

BRIEF DESCRIPTION OF THE DRAWINGS

FIG. 2b is a bottom perspective view illustrating an embodiment of the air shroud apparatus of FIG. 2a.

FIG. 3 is a perspective view illustrating an embodiment of a shroud cover used with the air shroud apparatus of FIGS. 2a, 2b, 2c and 2d.

FIG. 5a is a flow chart illustrating an embodiment of a method for directing air in a chassis.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
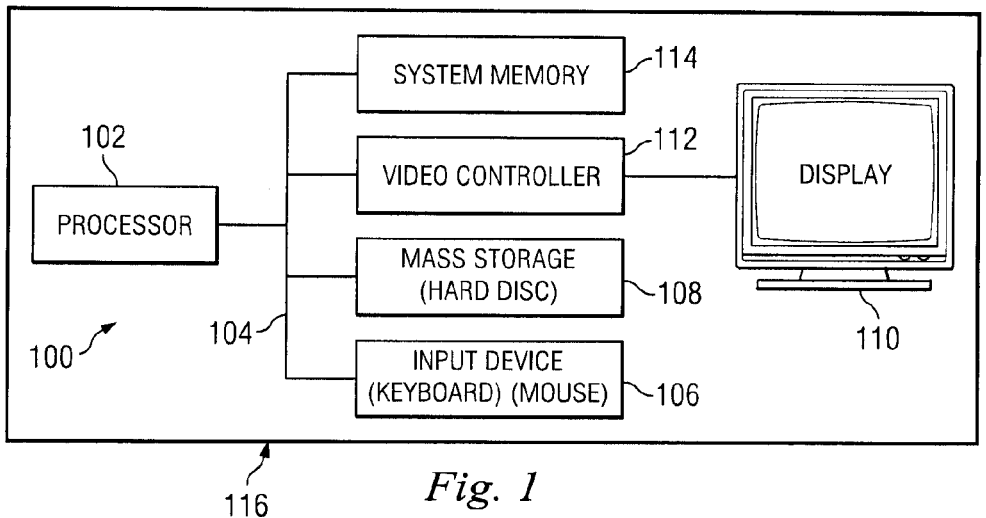
FIG. 1 is a schematic view illustrating an embodiment of an IHS.
Figure 2C:
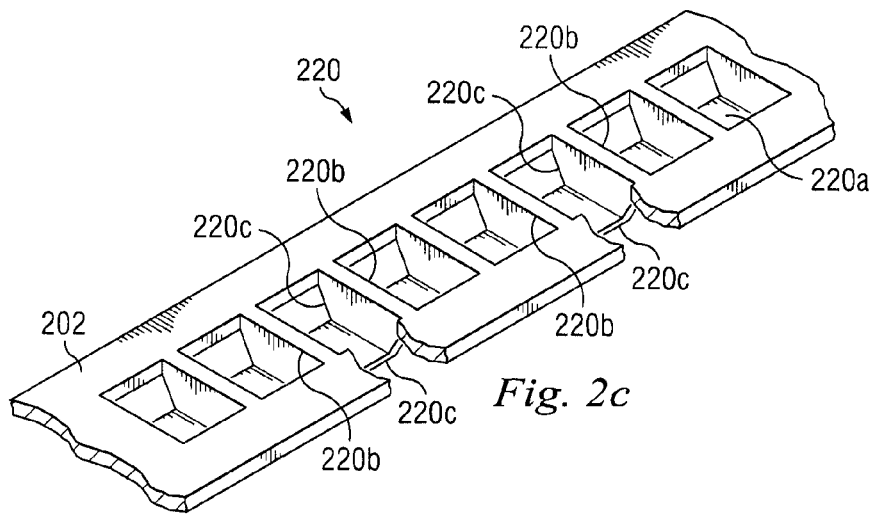
FIG. 2c is a perspective view illustrating an embodiment of a reinforced section on the air shroud apparatus of FIGS. 2a and 2b.
Figure 2D:
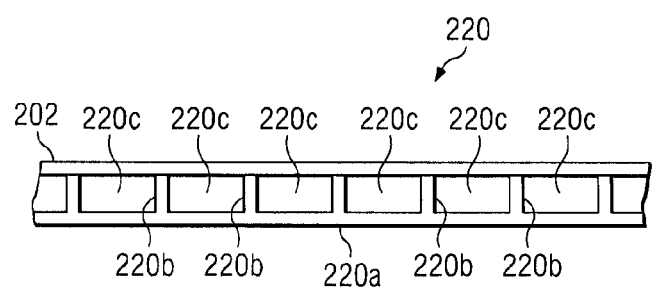
FIG. 2d is a side view illustrating an embodiment of the reinforced section of FIG. 2c.
Figure 2A:
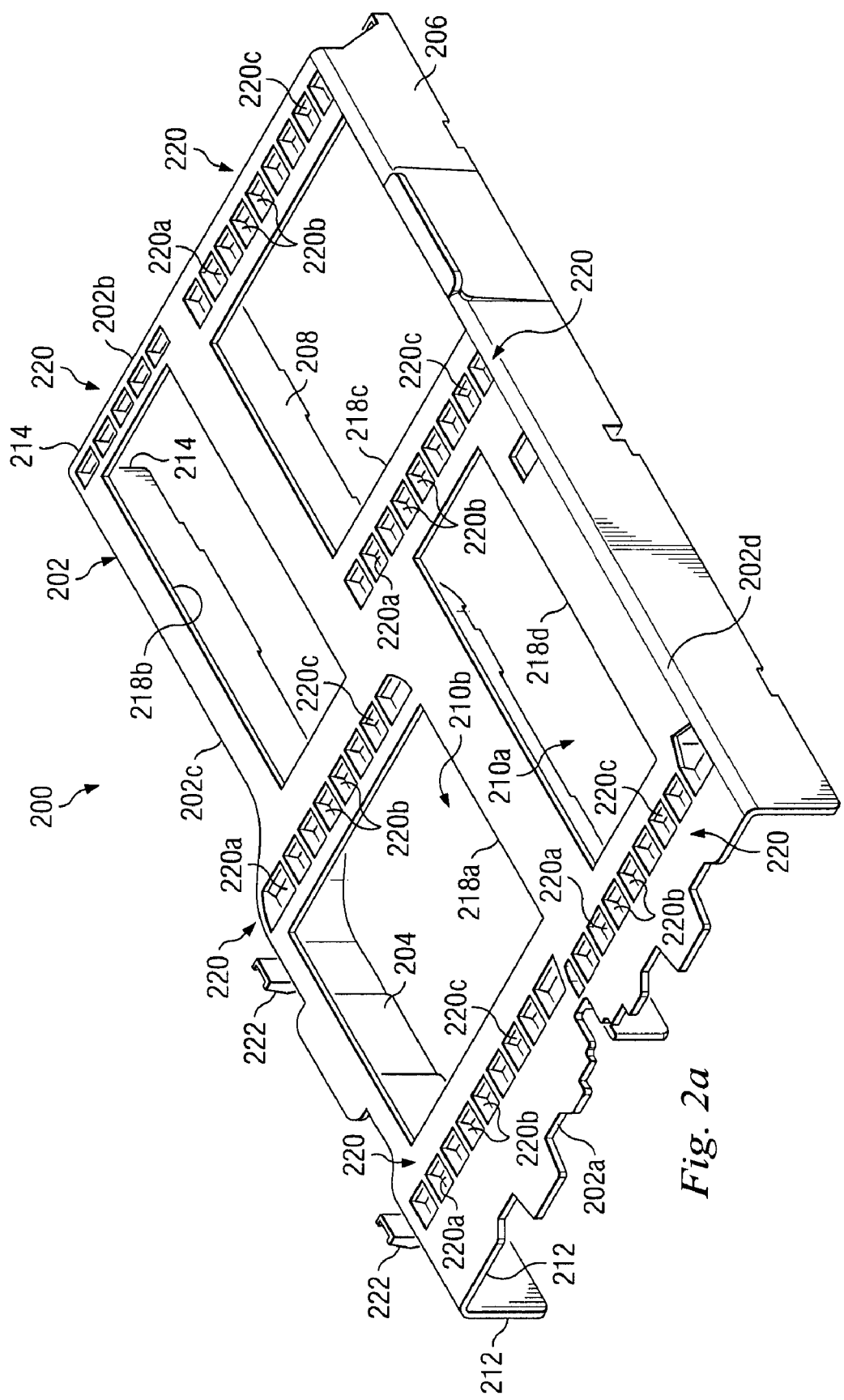
FIG. 2a is a top perspective view illustrating an embodiment of an air shroud apparatus.
Figure 2B:
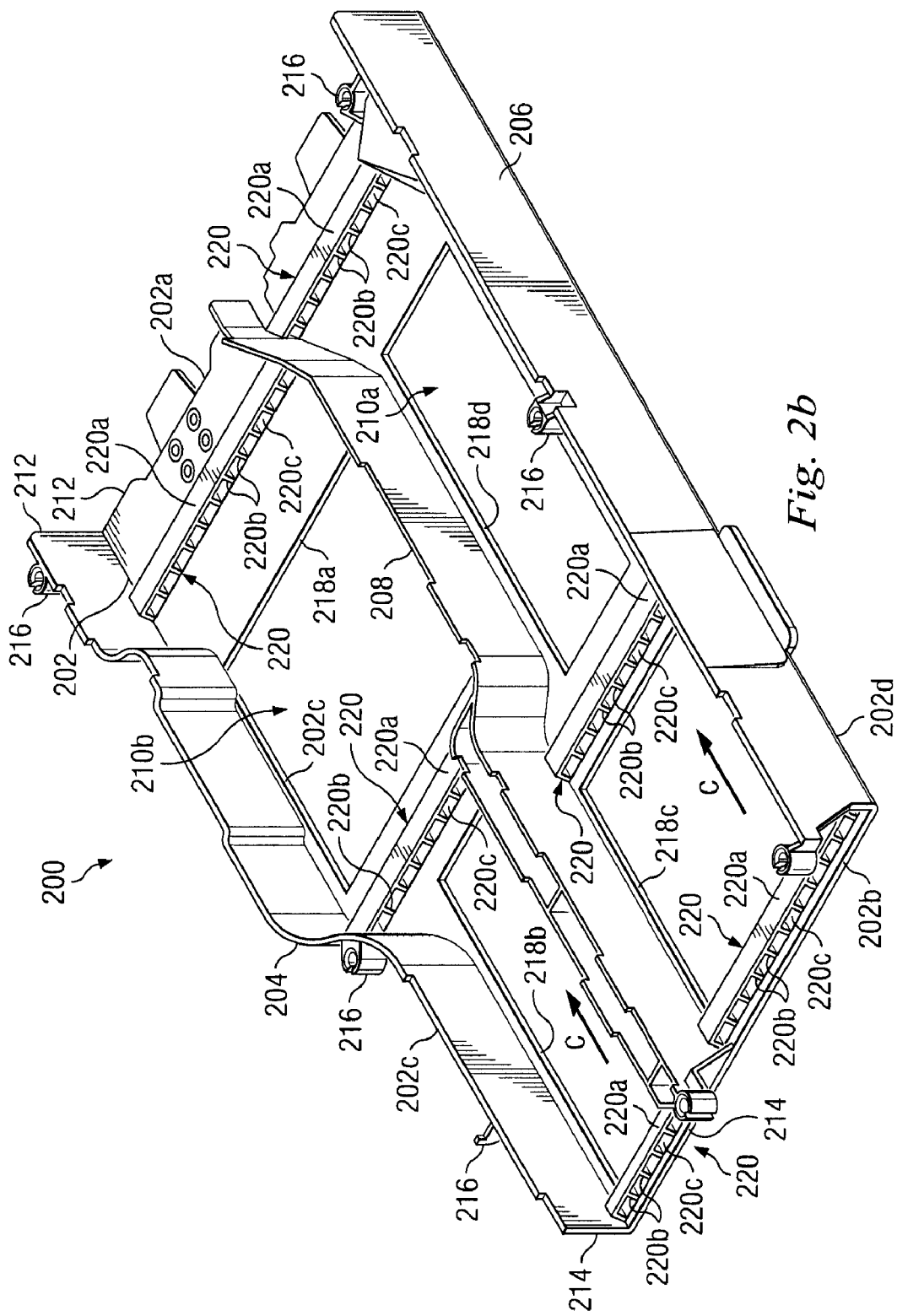

In one embodiment, IHS 100, FIG. 1, includes a processor 102, which is connected to a bus 104. Bus 104 serves as a connection between processor 102 and other components of computer system 100. An input device 106 is coupled to processor 102 to provide input to processor 102. Examples of input devices include keyboards, touchscreens, and pointing devices such as mouses, trackballs and trackpads. Programs and data are stored on a mass storage device 108, which is coupled to processor 102. Mass storage devices include such devices as hard disks, optical disks, magneto-optical drives, floppy drives and the like. IHS 100 further includes a display 110, which is coupled to processor 102 by a video controller 112. A system memory 114 is coupled to processor 102 to provide the processor with fast storage to facilitate execution of computer programs by processor 102. In an embodiment, a chassis 116 houses some or all of the components of IHS 100. It should be understood that other buses and intermediate circuits can be deployed between the components described above and processor 102 to facilitate interconnection between the components and the processor 102.

Referring now to FIGS. 2a, 2b, 2c and 2d, an air shroud apparatus 200 is illustrated. The air shroud apparatus 200 includes a base wall 202 having a front edge 202a, a rear edge 202b located opposite the front edge 202a, and a pair of opposing side edges 202c and 202d extending between the front edge 202a and the rear edge 202b. A pair of outer support walls 204 and 206 extend from the side edges 202c and 202d, respectively, of the base wall 202 in a spaced apart and substantially parallel orientation to each other. An intermediate support wall 208 extends from the base wall 202 between the outer support walls 204 and 206 and in a substantially parallel orientation to the outer support walls 204 and 206. A component housing 210a is defined between the base wall 202, the outer support wall 206, and the intermediate support wall 208 and extends along the length of the air shroud apparatus 200 from the front edge 202a of the base wall 202 to the rear edge 202b of the base wall 202. A component housing 210b is defined between the base wall 202, the outer support wall 204, and the intermediate support wall 208 and extends along the length of the air shroud apparatus 200 from the front edge 202a of the base wall 202 to the rear edge 202b of the base wall 202. An air entrance 212 is defined by the front edge 202a of the base wall 202 and the outer support walls 204 and 206 and is located adjacent the component housings 210a and 210b. An air exit 214 is defined by the rear edge 202b of the base wall 202 and the outer support walls 204 and 206 and is located opposite the component housings 210a and 210b from the air entrance 212. A plurality of chassis coupling members 216 are located on the outer support walls 204 and 206 in a spaced apart relationship along the length of the air shroud apparatus 200. A plurality of component access passageways 218a, 218b, 218c and 218d are defined by the base wall 202 and located on the base wall 202 such that the component access passageways 218a and 218b are located adjacent the component housing 210b and the component access passageways 218c and 218d are located adjacent the component housing 210a. A plurality of reinforced sections 220 are included on the air shroud apparatus 200, with a reinforced section 220 located on the air shroud apparatus 200 between the front edge 202a of the base wall 202 and the component access passageway 218a, a reinforced section 220 located on the air shroud apparatus 200 between the component access passageway 218a and the component access passageway 218b, a reinforced section 220 located on the air shroud apparatus 200 between the component access passageway 218b and the rear edge 202b of the base wall 202, a reinforced section 220 located on the air shroud apparatus 200 between the front edge 202a of the base wall 202 and the component access passageway 218d, a reinforced section 220 located on the air shroud apparatus 200 between the component access passageway 218d and the component access passageway 218c, and a reinforced section 220 located on the air shroud apparatus 200 between the component access passageway 218c and the rear edge 202b of the base wall 202. Each reinforced section 220 includes a reinforcing beam 220a extending between the outer support wall 204 and the intermediate support wall 208 or between the outer support wall 206 and the intermediate support wall 208. Each reinforced sections 220 also includes a plurality of reinforcing members 220b that extend between the reinforcing beam 220a and the base wall 202 in a spaced apart orientation from each other such that a plurality of air passageways 220c are defined between each pair of reinforcing members 220b on either side of the reinforcing beam 220a. The air shroud apparatus 200 also includes a plurality of cover coupling members 222 extending from the outer support wall 204.

Referring now to FIG. 3, a shroud cover 300 is illustrated. The shroud cover 300 includes a cover wall 302 having a top surface 302a, a bottom surface 302b located opposite the top surface 302a, a front edge 302c extending between the top surface 302a and the bottom surface 302b, a rear edge 302d located opposite the front edge 302c and extending between the top surface 302a and the bottom surface 302b, and a pair of opposing side edges 302e and 302f extending between the top surface 302a, the bottom surface 302b, the front edge 302c, and the rear edge 302d. A shroud coupling member (not shown) may extend from the bottom surface 302b of the base 302 adjacent the side edge 302e.

Figure 4:
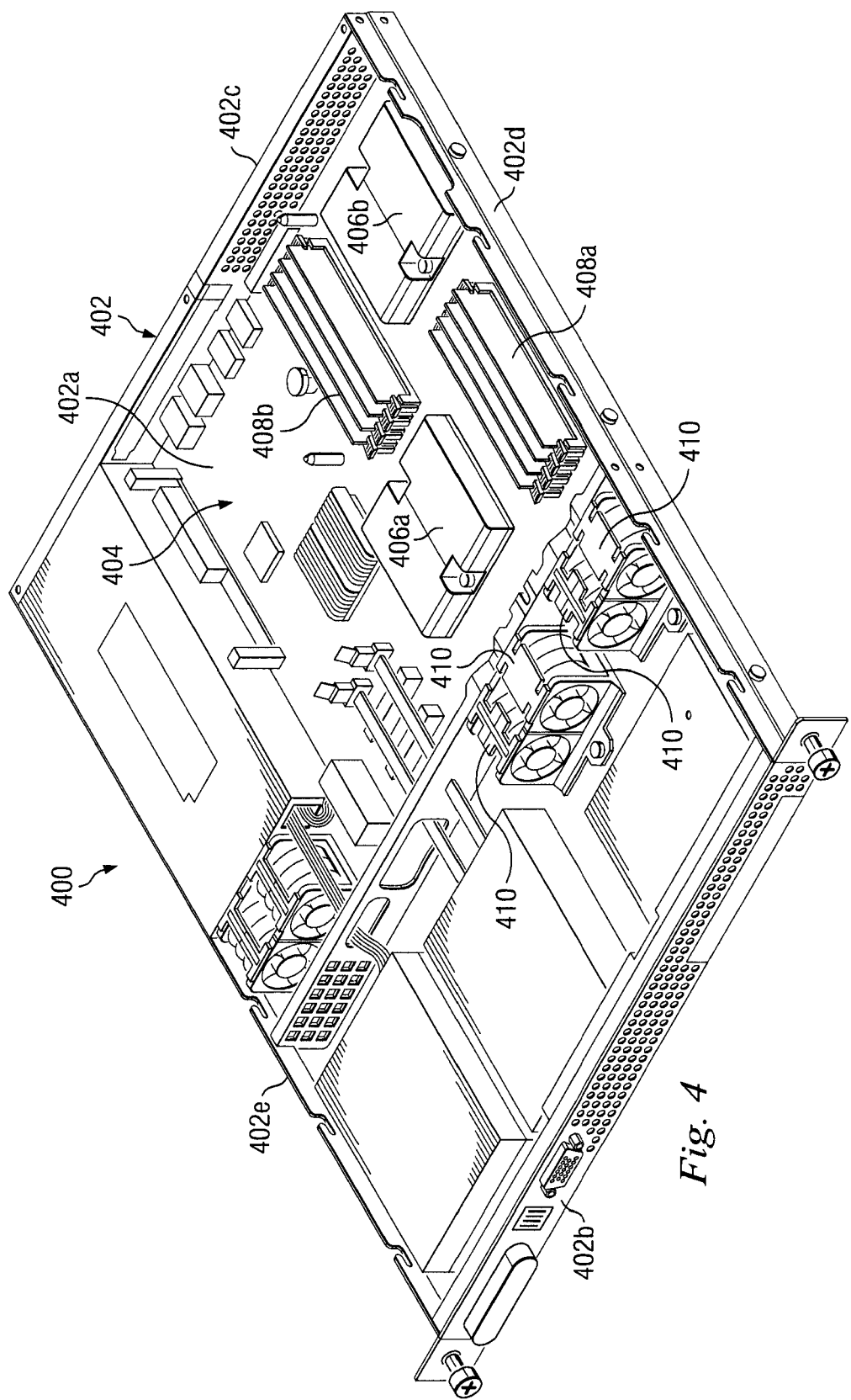
FIG. 4 is a perspective view illustrating an embodiment of an IHS chassis used with the air shroud apparatus of FIGS. 2a, 2b, 2c and 2d and the shroud cover of FIG. 3.

Referring now to FIG. 4, an IHS chassis is illustrated. The IHS chassis 400 may be, for example, the chassis 116, described above with reference to FIG. 1, and may house some or all of the components of the IHS 100, described above with reference to FIG. 1. The IHS chassis 400 includes a base 402 having a bottom wall 402a, front wall 402b extending from the bottom wall 402a, a rear wall 402c located opposite the front wall 402b and extending from the bottom wall 402a in a substantially parallel orientation to the front wall 402a, and a pair of opposing side walls 402d and 402e extending from the bottom wall 402a and between the front wall 402b and the rear wall 402c in a substantially parallel orientation to each other. An IHS housing 404 is defined between the bottom wall 402a, the front wall 402b, the rear wall 402c, and the side walls 402d and 402e. A plurality of heat sinks 406a and 406b are located in the IHS housing 404 and coupled to the bottom wall 402a. In an embodiment, the heat sinks 406a and 406b are thermally coupled to processors such as, for example, the processor 102, described above with reference to FIG. 1. A plurality of memory components 408a and 408b are located in the IHS housing 404 and coupled to the bottom wall 402a adjacent the heat sinks 406a and 406b. A plurality of fans 410 are located in the IHS housing 404 adjacent the heat sink 406a and the memory component 408a.

Figure 5B:
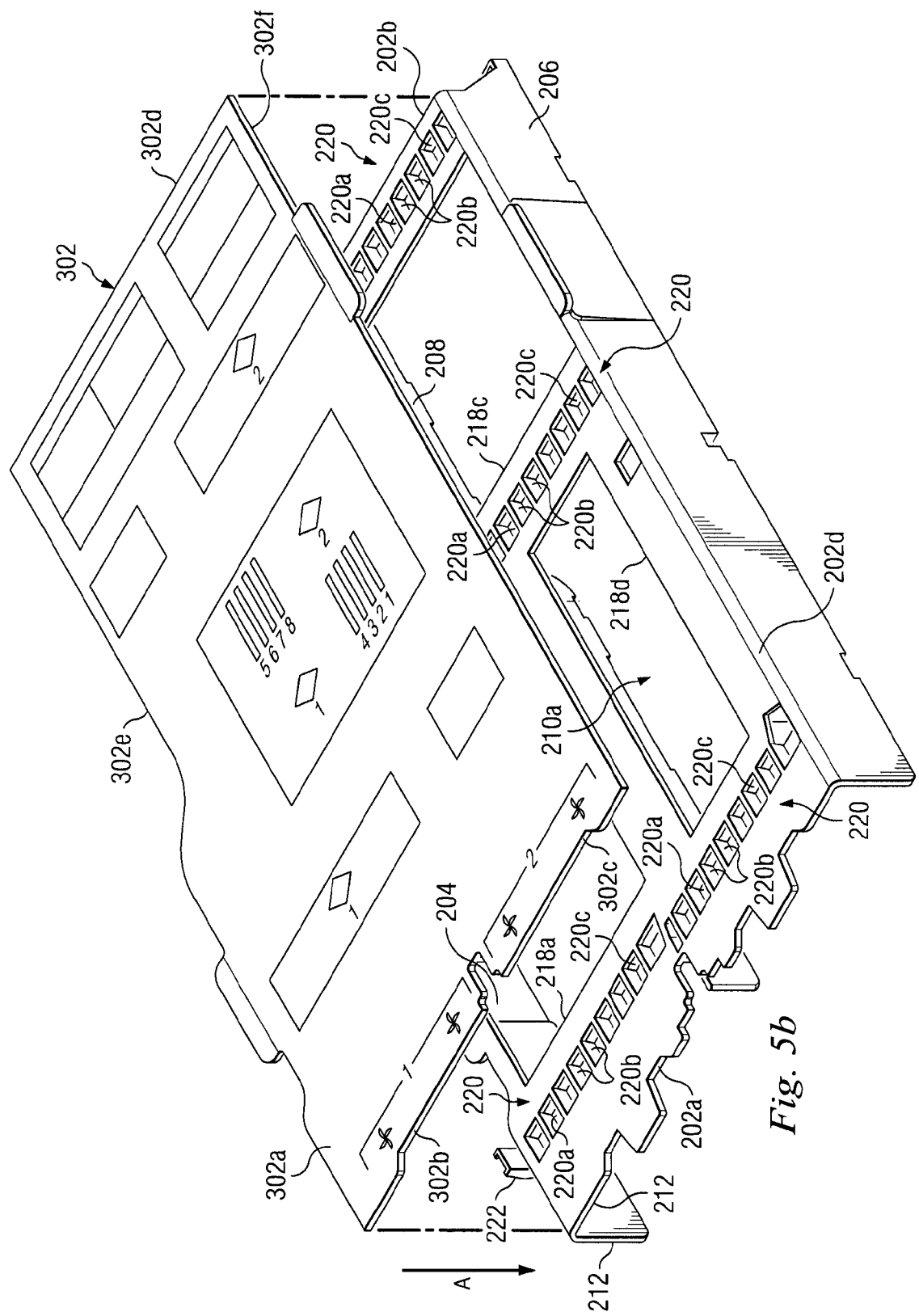
FIG. 5b is a perspective view illustrating an embodiment of the shroud cover of FIG. 3 being coupled to the air shroud apparatus of FIGS. 2a, 2b, 2c and 2d.
Figure 5C:
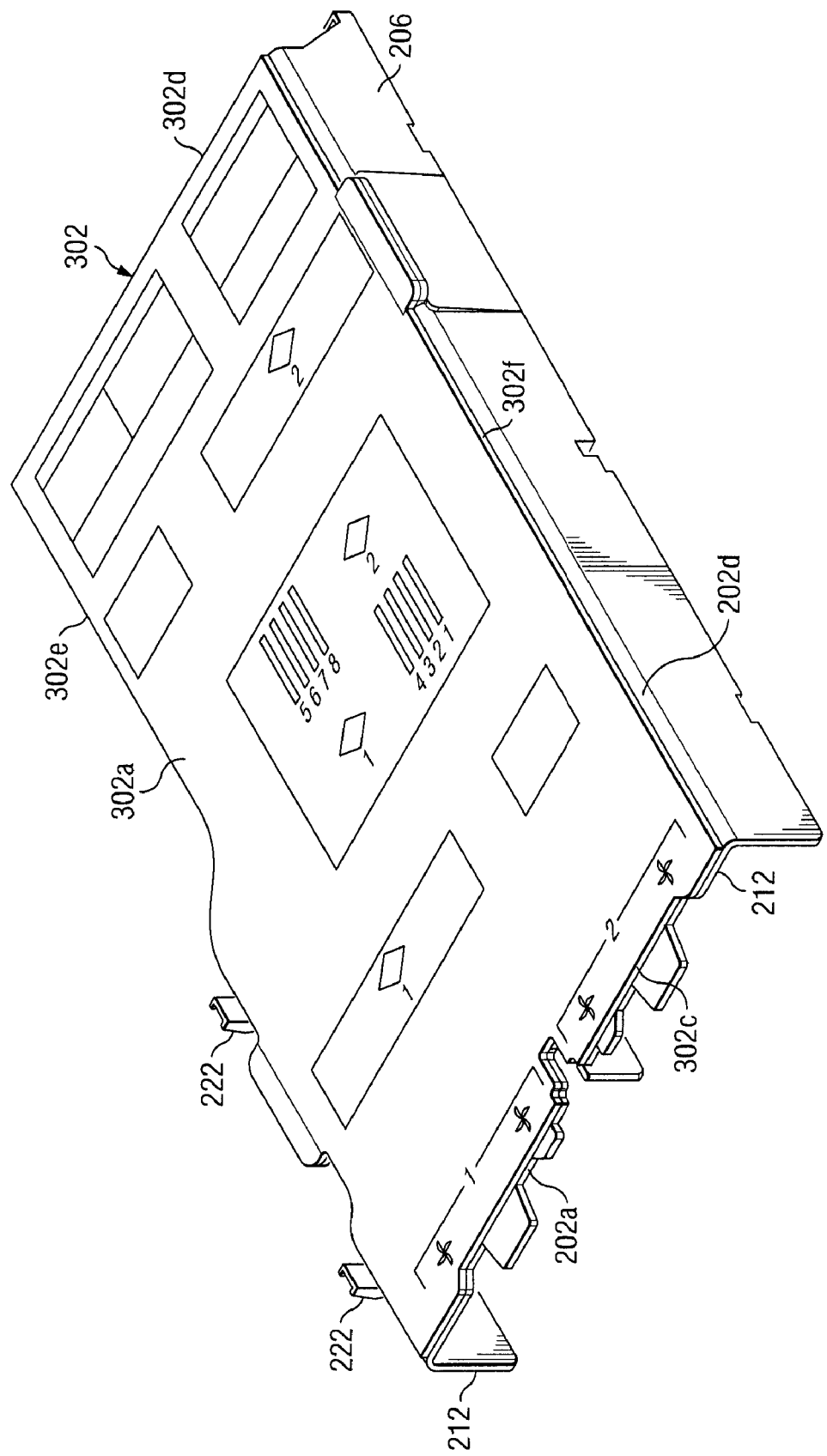
FIG. 5c is a perspective view illustrating an embodiment of the shroud cover of FIG. 3 coupled to the air shroud apparatus of FIGS. 2a, 2b, 2c and 2d.

Referring now to FIGS. 2a, 2b, 2c, 2d, 3, 5a, 5b and 5c, a method 500 for directing air in a chassis is illustrated. The method 500 begins at step 502 where an air shroud apparatus is provided. The air shroud apparatus 200, described above with reference to FIGS. 2a, 2b, 2c and 2d, is provided. The reinforced sections 220 on the air shroud apparatus 200 substantially increase the structural stiffness of the air shroud apparatus 200 relative to convention air shrouds designed for similar IHS chassis such that the air shroud apparatus 200 exhibits a structurally stable feel relative to the typically flimsy feel of the conventional air shrouds. The method 500 then proceeds to step 504 where a shroud cover is coupled to the air shroud apparatus. The shroud cover 300 is positioned adjacent the air shroud apparatus 200 such that the bottom surface 302b of the shroud cover 300 is located adjacent the base wall 202 of the air shroud 200, the front edge 302c of the shroud cover 300 located adjacent the front edge 202a of the base wall 202, and the rear edge 302d of the shroud cover 300 is located adjacent the rear edge 202b of the base wall 202, as illustrated in FIG. 5b. The shroud cover 300 is then moved in a direction A such that the bottom surface 302b of the shroud cover 300 engages the base wall 202 and covers the component access passageways 218a, 218b, 218c and 218d, as illustrated in FIG. 5c. In an embodiment, the shroud coupling member (not shown) on the shroud cover 300 engages the cover coupling members 222 on the air shroud apparatus 200 to secure the shroud cover 300 to the air shroud apparatus 200.

Figure 5D:
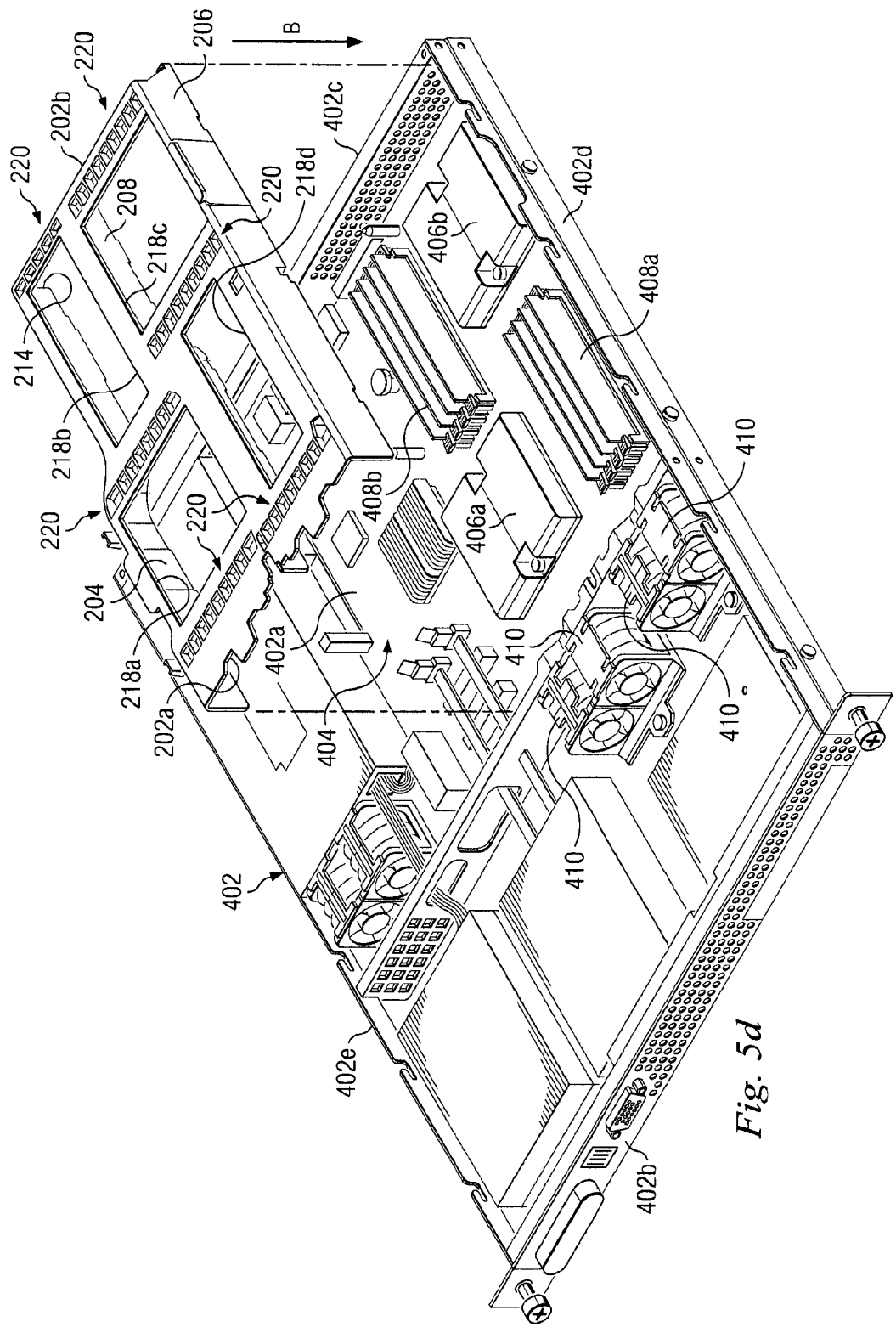
FIG. 5d is a perspective view illustrating an embodiment of the air shroud apparatus of FIGS. 2a, 2b, 2c and 2d being coupled to the IHS chassis of FIG. 4.
Figure 5E:
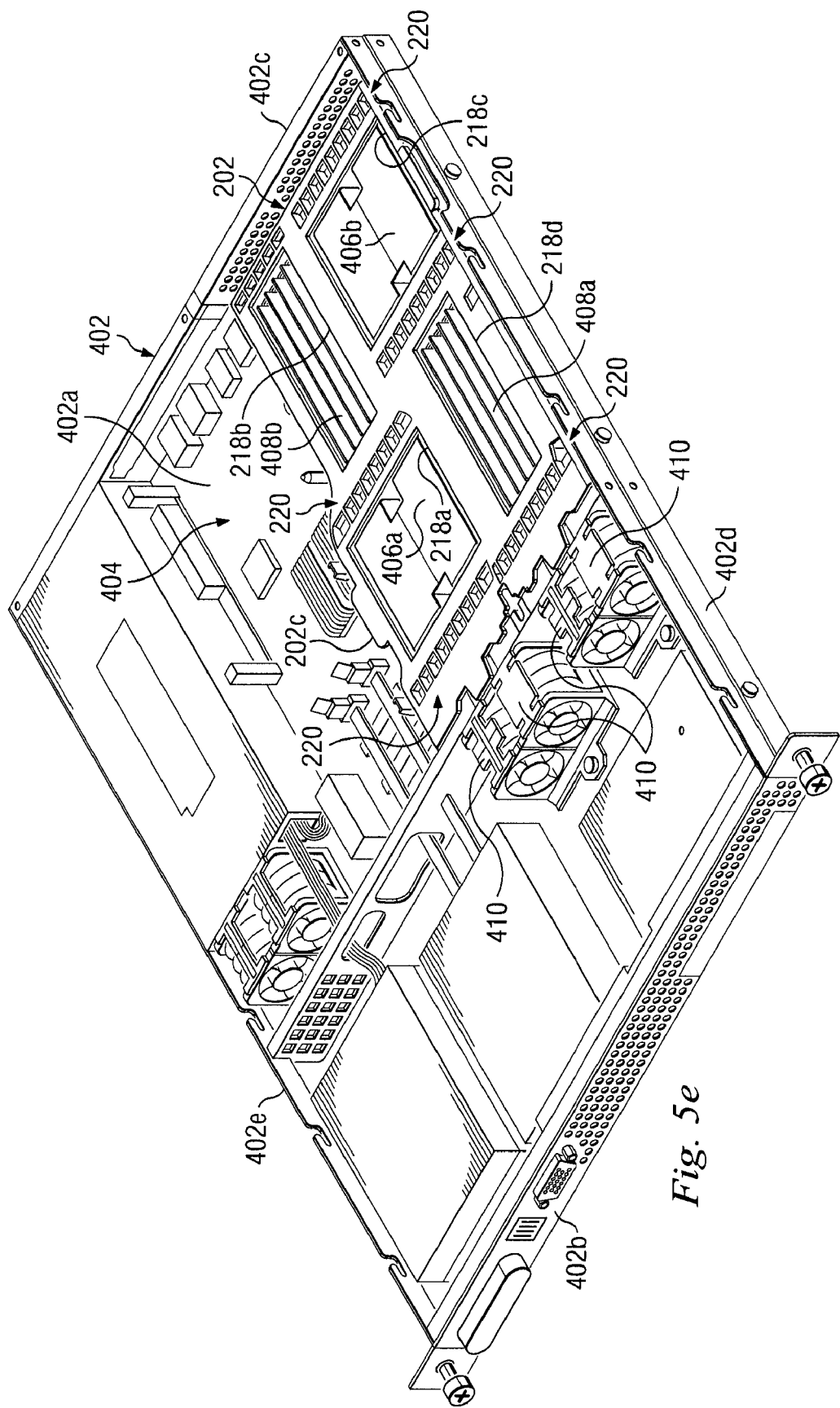
FIG. 5e is a perspective view illustrating an embodiment of the air shroud apparatus of FIGS. 2a, 2b, 2c and 2d coupled to the IHS chassis of FIG. 4.

Referring now to FIGS. 2a, 2b, 2c, 2d, 4, 5a, 5d, 5e and 5f, the method 500 proceeds to step 506 where the air shroud apparatus is coupled to the chassis. The shroud cover 300 that was coupled to the air shroud apparatus 200 in step 504 of the method 500 has been removed in FIGS. 5d and 5e for clarity of discussion. The air shroud apparatus 200 is positioned adjacent the IHS chassis 400 such that the heat sinks 406a are located adjacent the component access passageway 218a, the memory components 408b are located adjacent the component access passageway 218b, the heat sinks 406b are located adjacent the component access passageway 218c, and the memory components 408a are located adjacent the component access passageway 218d, as illustrated in FIG. 5d. The air shroud apparatus 200 is then moved in a direction B into the IHS housing 404 such that the outer support walls 204 and 206 and the intermediate support wall 208 engage the bottom wall 402a of the IHS chassis 400. The air shroud apparatus 200 may be coupled to the IHS chassis 400 by engaging the chassis coupling members 216 on the air shroud apparatus 200 with features on the bottom wall 402a of the IHS chassis 400 and/or using, for example, threaded fasteners to secure the air shroud apparatus 200 to the bottom wall 402a. With the air shroud apparatus coupled to the IHS chassis 400, the fans 410 in the IHS housing 404 are located adjacent the air entrance 212 defined by the air shroud apparatus 200, the heat sinks 406a and the memory components 408b are located in the component housing 210b and the heat sinks 406b and the memory components 408a are located in the component housing 210a, as illustrated in FIG. 5e. With the shroud cover 300 removed from the air shroud apparatus 200, as illustrated in FIG. 5e, the heat sinks 406a may be accessed through the component access passageway 218a, the memory components 408b may be accessed through the component access passageway 218b, the heat sinks 406b may be accessed through the component access passageway 218c, the memory components 408a may be accessed through the component access passageway 218d.

Figure 5F:
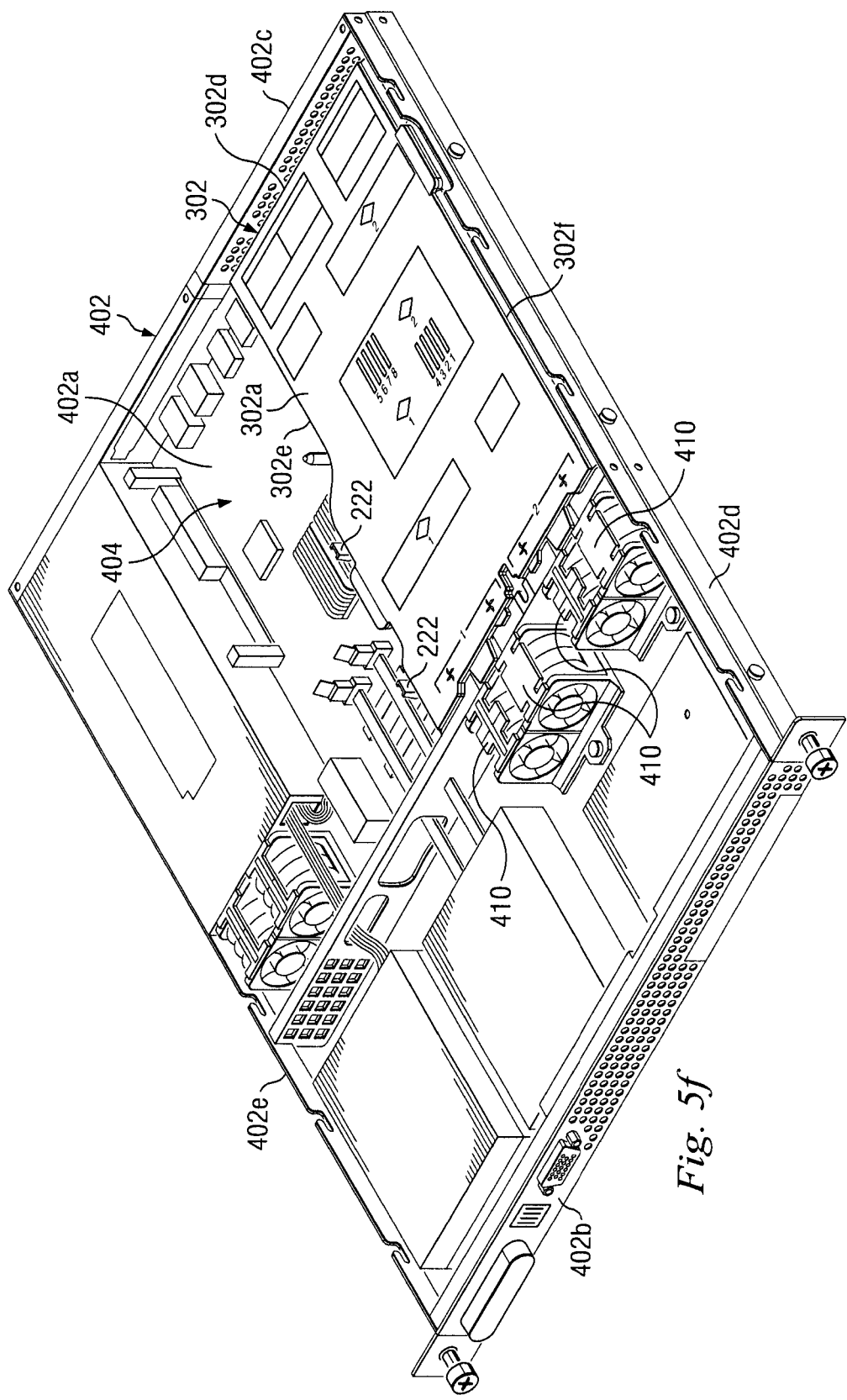
FIG. 5f is a perspective view illustrating an embodiment of the shroud cover and the air shroud apparatus of FIG. 5c coupled to the IHS chassis of FIG. 4.

With the shroud cover 300 coupled to the air shroud apparatus 200, as illustrated in FIG. 5f, the method 500 may proceed to step 508 where the fans 410 are operated and the airflow from the fans 410 is directed with the air shroud apparatus 200. Airflow from the fans 410 enters the air shroud apparatus 200 at the air entrance 212 and is directed by the base wall 202, the shroud cover 300, the outer support walls 204 and 206, and the intermediate support wall 208 such that the airflow flows through the components housings 210a and 210b in an airflow direction C, illustrated in FIG. 2b, towards the heat sinks 406a and 406b and the memory components 408a and 408b. The airflow passageways 220c defined by each of the reinforced sections 220 allow airflow past the reinforced sections and through to the heat sinks 406a and 406b and the memory components 408a and 408b without substantially impeding the airflow, as the reinforced sections 220 have little frontal area with which to impede the airflow. Thus, an air shroud apparatus 200 is provided which is designed for a limited space, is structurally stiff compared to conventional air shrouds designed for similar spaces, and does not significantly impede airflow through the air shroud. In an experimental embodiment, the air shroud apparatus 200 including the reinforced sections 220 provided cooling to processors located the component housings 210a and 210b that was within 0.1 degrees Celcius of the cooling provided with a conventional air shroud.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An air shroud apparatus, comprising:
 a base wall;
 a plurality of support walls extending from the base wall in a spaced apart orientation from each other and defining a component housing between the support walls and the base wall; and
 a reinforced section comprising:
  a reinforcing beam extending between the plurality of support walls; and
  a plurality of reinforcing members extending between the base wall and the reinforcing beam and located in a spaced apart orientation between the plurality of support walls such that a plurality of air passageways are defined between the reinforcing beam and the reinforcing members.

2. The apparatus of claim 1, a chassis coupling member located on at least one of the support walls.

3. The apparatus of claim 1, wherein the base wall defines a component access passageway located adjacent the component housing.

4. The apparatus of claim 3, further comprising:
 a plurality of the reinforced sections located on the base wall, wherein the reinforced sections are located on opposite sides of the component access passageway.

5. The apparatus of claim 1, further comprising:
 an air entrance defined by the base wall and support walls; and
 an air exit defined by the base wall and support walls and located opposite the base wall and support walls from the air entrance such that airflow from a fan flows substantially in an airflow direction along the length of the base wall and the support walls from the air entrance to the air exit, whereby the reinforced section comprises an elongated section that is oriented substantially perpendicularly to the airflow direction.

6. The apparatus of claim 1, further comprising:
 a cover coupling member coupled to the base wall.

7. The apparatus of claim 1, further comprising:
 a shroud cover comprising a cover wall and operable to couple to the base wall such that the cover wall is located immediately adjacent the base wall and a component access passageway defined by the base wall.

8. The apparatus of claim 7, wherein a shroud coupling member is located on the shroud cover.

9. An information handling system, comprising:
 an information handling system chassis;
 a processor coupled to the chassis;
 a fan coupled to the chassis;
 an information handling system component coupled to the chassis and electrically coupled to the processor; and
 an air shroud apparatus coupled to the chassis, the air shroud apparatus comprising:
  a base wall;

a plurality of support walls extending from the base wall in a spaced apart orientation from each other and defining a component housing between the support walls and the base wall, whereby the information handling system component is located in the component housing; and a reinforced section comprising:
 a reinforcing beam extending between the plurality of support walls; and
 a plurality of reinforcing members extending between the base wall and the reinforcing beam and located in a spaced apart orientation between the plurality of support walls such that a plurality of air passageways are defined between the reinforcing beam and the reinforcing members.

10. The system of claim 9, a chassis coupling member located on at least one of the support walls and coupled to the information handling system chassis.

11. The system of claim 9, wherein the base wall defines a component access passageway located adjacent the component housing such that the component may be accessed through the component access passageway.

12. The system of claim 11, further comprising:
a plurality of the reinforced sections located on the base wall, wherein the reinforced sections are located on opposite sides of the component access passageway.

13. The system of claim 9, further comprising:
an air entrance defined by the base wall and support walls and located adjacent the fan; and
an air exit defined by the base wall and support walls and located opposite the base wall and support walls from the air entrance such that airflow from a fan flows substantially in an airflow direction along the length of the base wall and the support walls from the air entrance to the air exit, whereby the reinforced section comprises an elongated section that is oriented substantially perpendicularly to the airflow direction.

14. The system of claim 9, further comprising:
a cover coupling member coupled to the base wall.

15. The system of claim 9, further comprising:
a shroud cover comprising a cover wall and coupled to the base wall such that the cover wall is located immediately adjacent the base wall and a component access passageway defined by the base wall.

16. The system of claim 15, wherein a shroud coupling member is located on the shroud cover and engages the air shroud apparatus to couple the shroud cover to the air shroud apparatus.

17. A method for directing air in a chassis, comprising:
providing an air shroud comprising a base wall, a plurality of support walls extending from the base wail in a spaced apart orientation from each other, a reinforcing beam extending between the plurality of support walls, and a plurality of reinforcing members extending between the base wall and the reinforcing beam and located in a spaced apart orientation between the plurality of support walls such that the plurality of reinforcing members define a plurality of air passageways each located between adjacent reinforcing members;
coupling the air shroud to an information handling system chassis, whereby a plurality of information handling system components are located between the support walls and the base wall;
operating a fan located in the information handling system chassis; and
directing airflow from the fan with the support walls and the base wall towards the information handling system component.

18. The method of claim 17, further comprising;
accessing the information handling system component through a component access passageway defined by the base wall.

19. The method of claim 17, further comprising:
coupling a shroud cover to the air shroud.

20. The method of claim 17, wherein the directing airflow from the fan comprises allowing airflow through the plurality of air passageways to the information handling system components.

\* \* \* \* \*

UNITED STATES PATENT AND TRADEMARK OFFICE
CERTIFICATE OF CORRECTION

PATENT NO. : 7,408,773 B2
APPLICATION NO. : 11/563468
DATED : August 5, 2008
INVENTOR(S) : Eric C. Wobig et al.

It is certified that error appears in the above-identified patent and that said Letters Patent is hereby corrected as shown below:

Claim 17, Column 8, Line 12: delete "wail" and insert --wall--.

Signed and Sealed this

Fourteenth Day of April, 2009

JOHN DOLL
*Acting Director of the United States Patent and Trademark Office*